United States Patent [19]

Okubo

[11] 4,219,940

[45] Sep. 2, 1980

[54] ANGULAR ACCELEROMETER STABILIZED PENDULUM

[76] Inventor: Shigeo Okubo, 5412 N. Nevada #203, Colorado Springs, Colo. 80907

[21] Appl. No.: 930,850

[22] Filed: Aug. 4, 1978

[51] Int. Cl.$^2$ .............................................. G01C 9/06
[52] U.S. Cl. ....................................................... 33/366
[58] Field of Search .......................................... 33/366

[56] References Cited

U.S. PATENT DOCUMENTS

| 2,497,607 | 2/1950 | Herr | 33/366 X |
| 2,942,864 | 6/1960 | Sikora | 73/504 X |
| 3,537,307 | 11/1970 | Pliha | 33/366 X |

Primary Examiner—Charles E. Phillips
Attorney, Agent, or Firm—Townsend and Townsend

[57] ABSTRACT

A gyroless vertical indicating device which tracks the local gravity vector independent of horizontal acceleration. A compound pendulum and an angular accelerometer each has a single rotational degree of freedom about a common axis. Rotational motion of the pendulum and of the angular accelerometer about the axis is coupled by a quartz fiber suspension therealong. A signal representative of the relative angular velocity between the pendulum and the angular accelerometer is fed back to a torquing system which maintains the pendulum's orientation along the local gravity vector.

15 Claims, 12 Drawing Figures

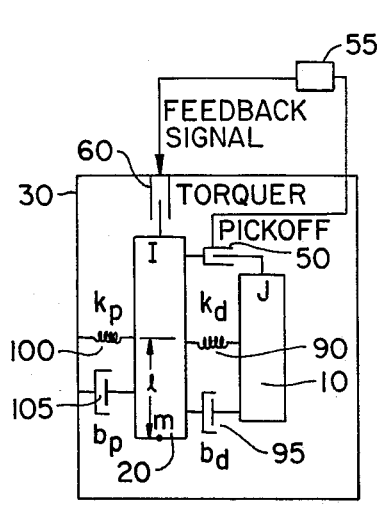
FIG._2a.
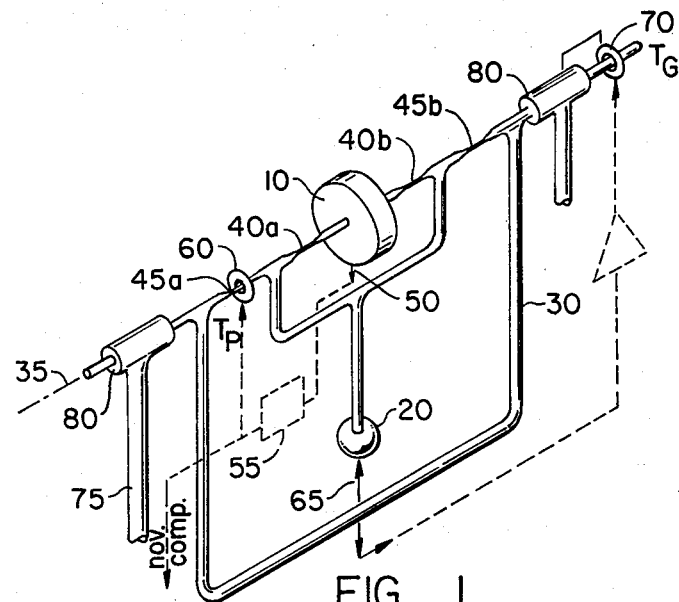
FIG._1.
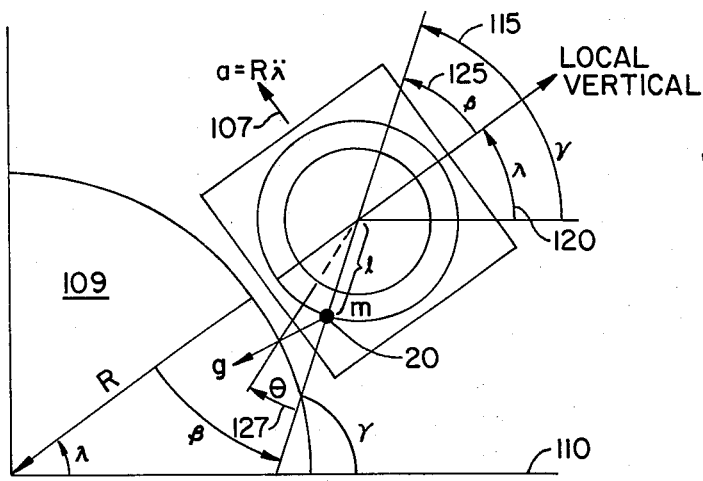
FIG._2b.
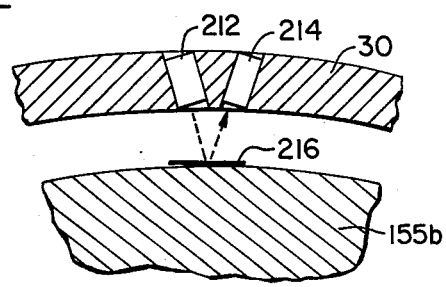
FIG._10.
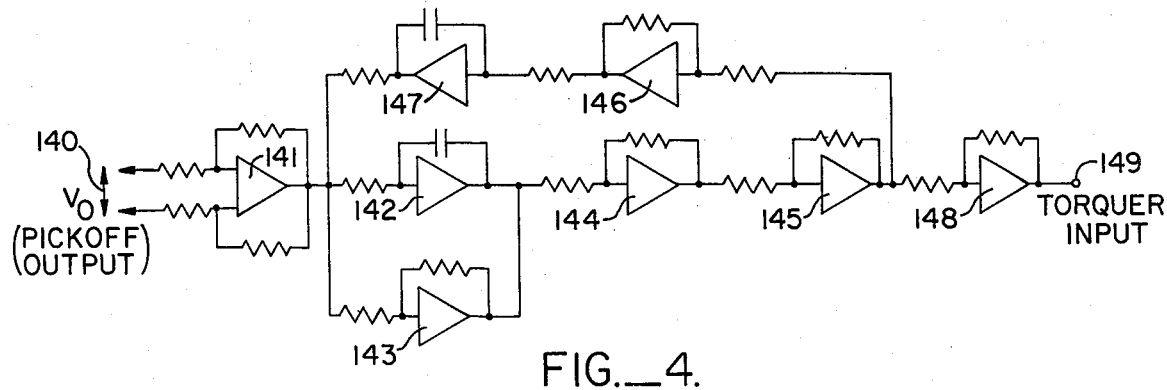
FIG._4.

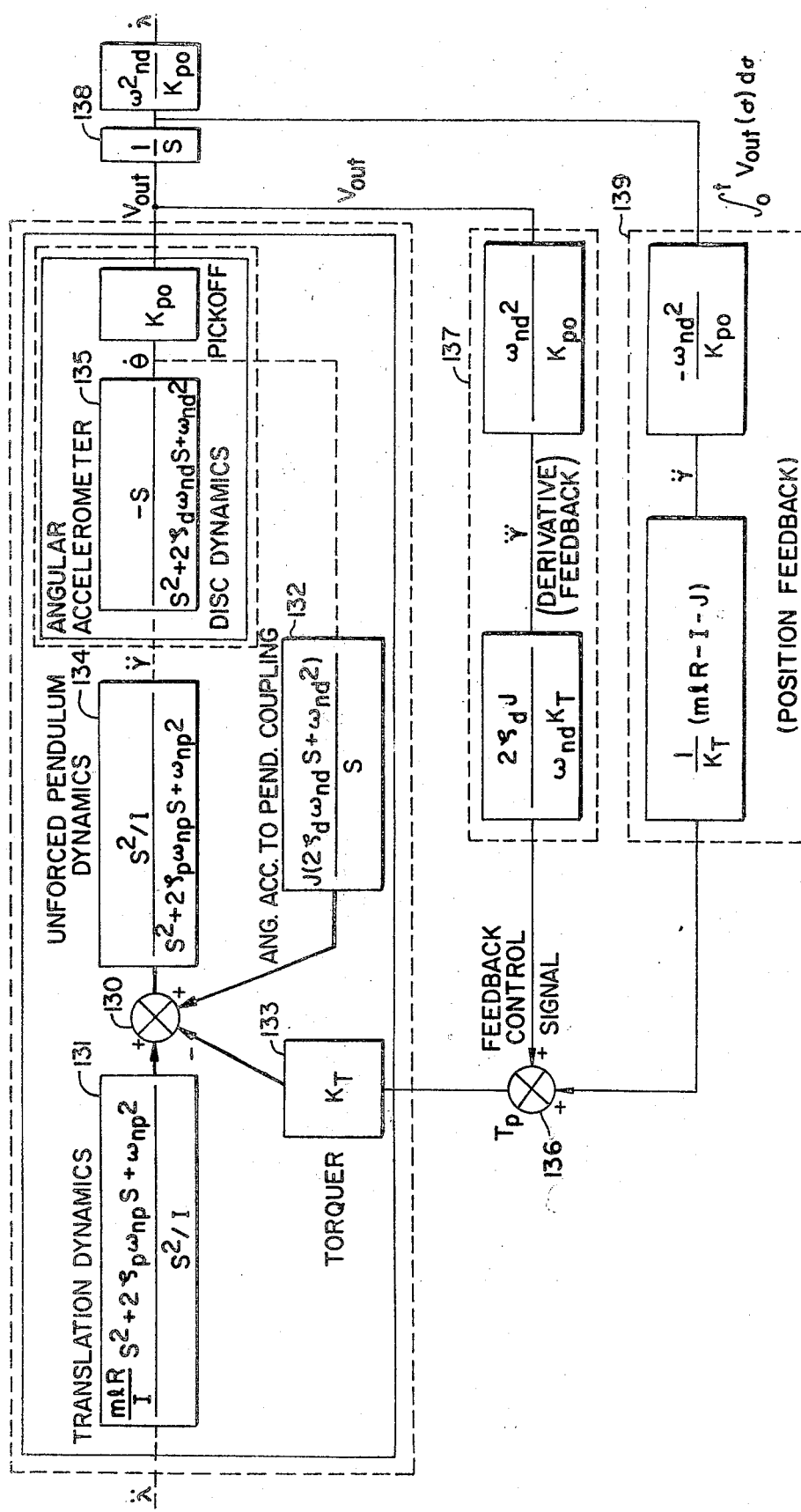
FIG._3.

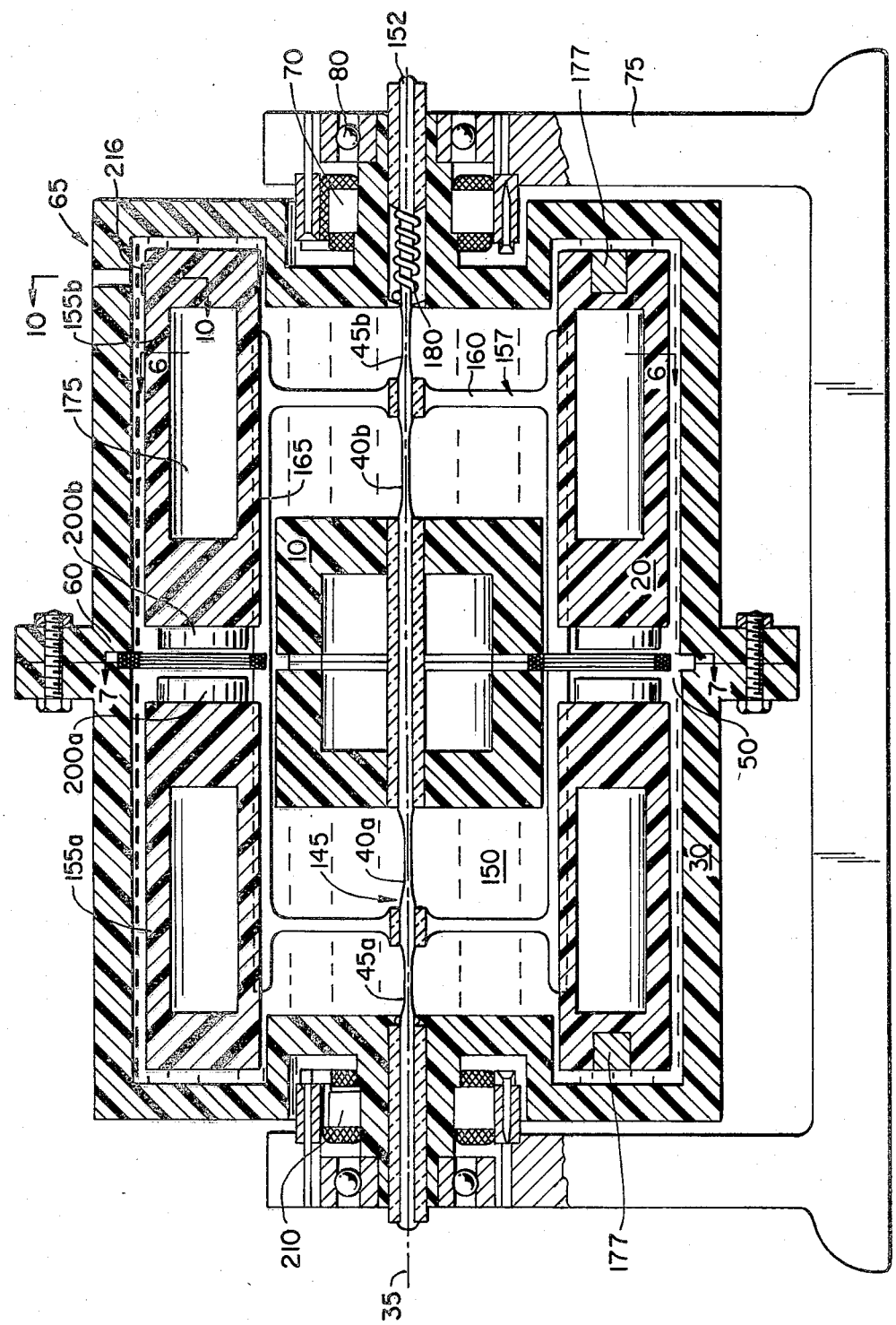
FIG._5.

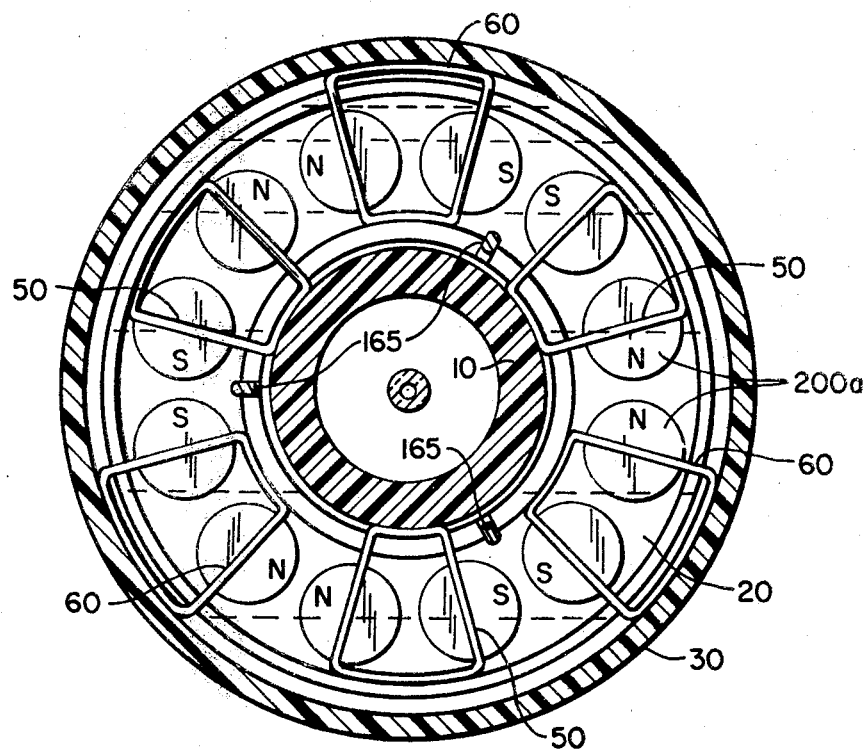
FIG._7.
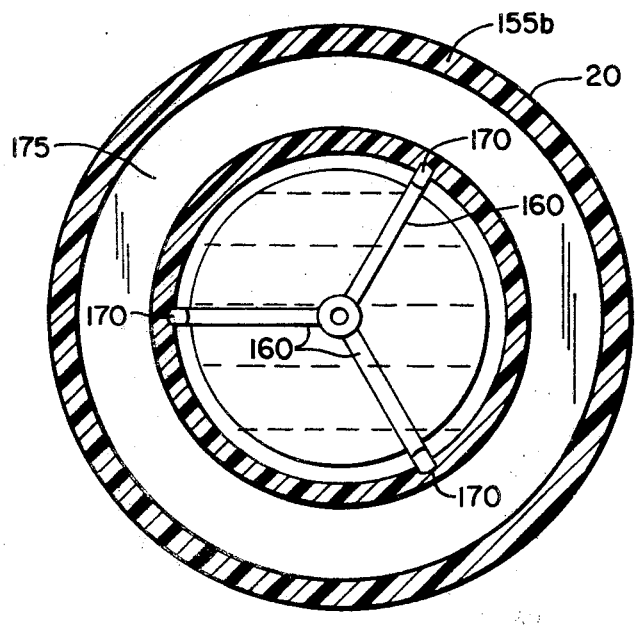
FIG._6.

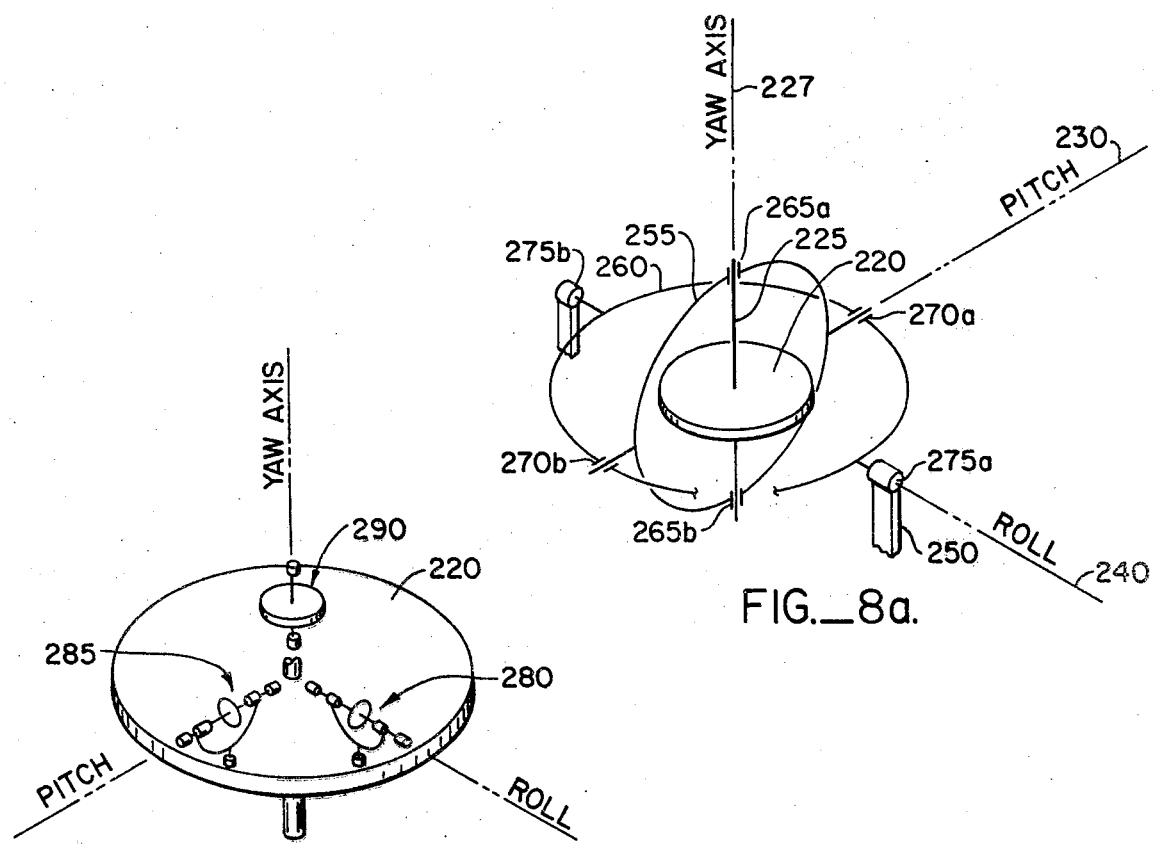
FIG._8a.
FIG._8b.
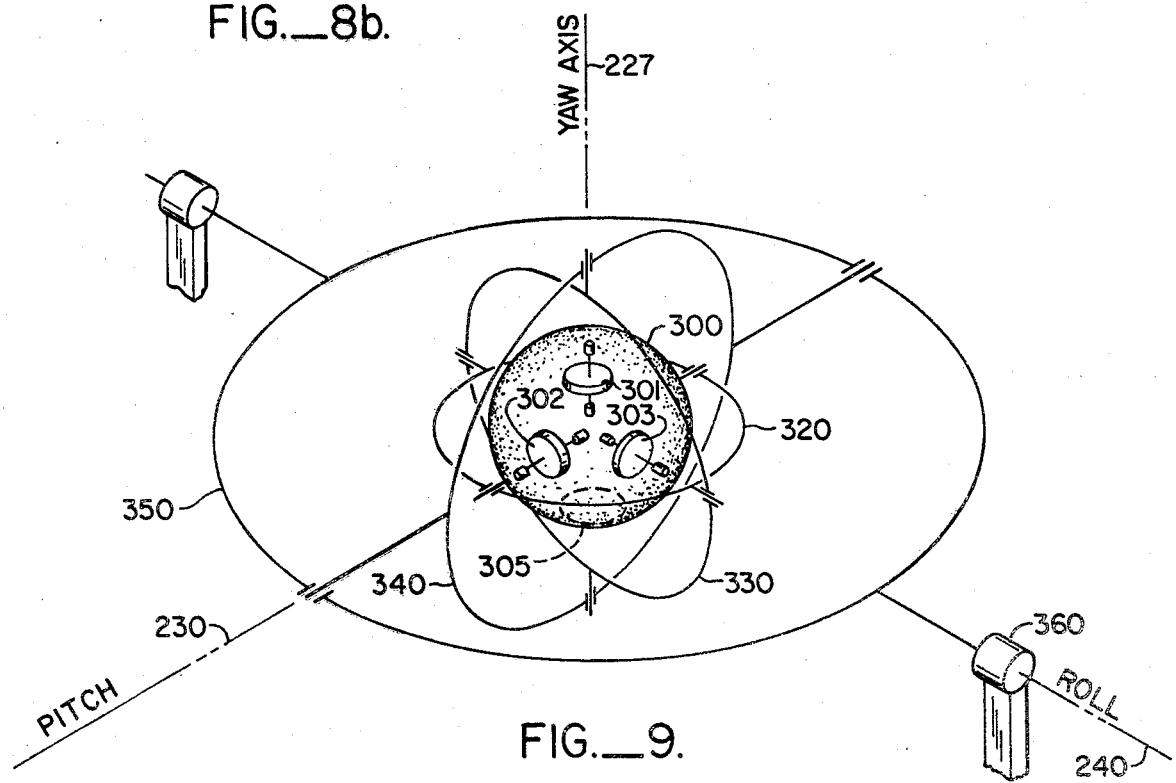
FIG._9.

ANGULAR ACCELEROMETER STABILIZED PENDULUM

BACKGROUND OF THE INVENTION

This invention relates generally to devices for indicating the direction of the local gravity vector, independent of acceleration of the base on which the device is mounted.

It is highly desirable for navigation purposes to have a precise knowledge of the earth's gravitational field. One of the simplest devices that provides this information is the pendulum. However, a pendulum alone is not a suitable device for use on a moving base since the pendulum's orientation is dependent upon horizontal acceleration forces acting on the base as well as gravitational attraction forces. In fact, simple accelerometers employ the pendulum principle, with the angle of deflection of a pendulum from the vertical being used to measure the acceleration of the associated moving base, e.g. a vehicle. Proper operation of such devices requires a knowledge of true local vertical, which is only approximately true in the case of a vehicle or other moving base located on a horizontal surface. Thus, whenever a vehicle in which the pendulum is mounted is either accelerating or is positioned at an angle with respect to horizontal, the angular deflection information is an indeterminate combination of acceleration and inclination information, and therefore inadequate for the intended purpose.

It is well known in the art that a simple pendulum having a length equal to the earth's radius always maintains an orientation along the local gravity vector, independent of tangential acceleration, a condition which is known as Schuler tuning. Clearly, a pendulum having a physical dimension equal to the radius of the earth is a fiction; however, a physical realization of the Schuler tuning condition can be obtained by designing a pendulum whose period of oscillation is the same as that of a simple pendulum having a length equal to the earth's radius, which period is 84.4 minutes.

One way of achieving this result is to suspend a pendulum, which may be a compound pendulum and which may also have associated viscous damping and a torsional spring force, and to control the moment of inertia of the pendulum with a feedback system. By sensing the pendulum's angular acceleration, and feeding back a restoring torque to the pendulum pivot point, the pendulum is given an effective moment of inertia that is much greater than its physical moment of inertia. It can be shown that the Schuler tuning condition can be met if the following equation is satisfied:

$$T = -(mlR - I)\ddot{\gamma}$$

where T is the torque that is fed back, m is the unbalanced mass of the pendulum, l is the unbalanced arm of the unbalanced mass, R is the earth's radius, I is the pendulum moment of inertia, and $\ddot{\gamma}$ is the pendulum's angular acceleration.

Prior art devices aimed at achieving this electromechanical realization of the mechanically impossible Schuler tuned conditions have typically employed a gyroscope having a rotational axis which is perpendicular to the axis of rotation of the pendulum. The gyroscope is coupled to the pendulum motion by a gimballed frame and is provided with electrical circuitry for producing an electrical output signal representative of the angular motion of the pendulum. This signal is used to generate a restoring torque which is coupled to the pendulum to maintain the vertical orientation. U.S. Pat. No. 2,893,248 to Ecary and U.S. Pat. No. 3,272,017 to Hector are illustrative of this general technique. U.S. Pat. No. 1,741,792 to Draper et al and U.S. Pat. No. 2,811,043 to Bonnell also illustrate the use of gyroscopes with feedback control to maintain a desired orientation.

Such prior art devices incorporating a gyroscope for sensing angular motion of a pendulum suffer from several disadvantages, all of which are inherent to gyroscopes. For example, the gyroscope rotor must be designed to continuously operate at a high speed of rotation, which necessitates the use of special pressurized gas bearings designed to precise critical tolerances. In addition, the gyroscope must be carefully assembled by skilled personnel using sophisticated materials and assembly techniques. As a result of these requirements, devices of this type are relatively expensive to fabricate and to service. Further, such devices require relatively large amounts of electrical power when operated, due primarily to the need to maintain the gyroscope rotor at a constant velocity. In addition, all gyroscopes are subject to drift, particularly with varying ambient temperature, which introduces errors into the feedback signal and results in undesirable oscillations of the pendulum about the vertical.

Efforts to design a true vertical indicator devoid of the above-noted disadvantages have not met with success to date.

SUMMARY OF THE INVENTION

The invention is a vertical indicating device which is extremely accurate, substantially insensitive to ambient temperature variations, relatively inexpensive to fabricate, simple to design, and which requires only extremely low amounts of electric power to operate.

In the broadest aspect, the invention comprises a pendulum and an angular accelerometer mounted for rotation about a common axis. The mounting, which is preferably along a quartz fiber, serves to torsionally couple the pendulum and the angular accelerometer along their common axis. The assembly is mounted in a case which is journalled in a frame, the frame being fastened to a vehicle which may undergo horizontal acceleration. In order to make the pendulum track the local gravity vector independently of any horizontal acceleration force, a signal representative of the relative angular velocity between the pendulum and the angular accelerometer is fed to a torquer which restores the pendulum to a position aligned with the local gravity vector. In this manner, the pendulum is Schuler tuned by the electromechanical synthesis of a very large effective moment of inertia. A separate torquer slaves the case (which functions as a follow up gimbal) to the pendulum, so that a position pickoff between the case and the mounting frame reads directly in terms of the pendulum angle relative to the frame.

In order to compensate for dissipative mechanical coupling between the pendulum and the angular accelerometer and to stabilize the feedback loop, two types of signal are fed back. In addition to the relatively standard term proportional to the angular acceleration of the pendulum, a term proportional to the time derivative of the angular acceleration ("jerk") is fed back.

In the preferred embodiment of a single axis device, the angular accelerometer and the pendulum are hollow cylinders made neutrally buoyant in flotation fluid. The pendulum and accelerometer are suspended on pairs of fused quartz filaments which, because of the collinear design, makes a one-piece construction possible. Two single axis devices at right angles to one another can be combined with an angular accelerometer at right angles to both devices to provide a stabilized horizontal platform. A preferred embodiment of a 3-axis device makes use of a floated sphere for a 2 axis pendulum.

The elimination of a gyroscope from the design of the invention results in a vertical indicating device having no high speed moving parts. Thus, the problems of critical tolerances and sophisticated assembly techniques are virtually eliminated. This results in lowered manufacturing costs and increased reliability. Power requirements are also lowered due to the absence of any "active" elements.

The quartz fiber bearings for the pendulum and angular accelerometer provide high tensile strength while exhibiting low mechanical hysteresis and a low coefficient of thermal expansion. In addition, the fiber bearings provide torsional suspension which decouples the swing and twist vibrational modes from the torsional mode, and which enables fabrication of a low frequency device with high sensitivity.

The angular velocity pickoffs have low noise background thereby making possible extremely high gains employed in the feedback loop. In addition, the pickoffs are designed to eliminate bias and null uncertainty errors. Further, the pickoffs do not respond to low drift frequencies.

The use of neutrally buoyant cylinders for the pendulum and the angular accelerometer eliminates the anisoelastic torques suffered by prior art devices which result when such devices are subjected to linear vibrations. It is unnecessary to perfectly balance the angular accelerometer, although it is desirable that any imbalance coincide in direction with the intentional imbalance (pendulosity) of the pendulum.

The use of the case as an isolation gimbal slaved to the pendulum makes it possible for the base of the device to be continuously rotated without causing the fiber suspension to undergo unbounded twisting.

For a further understanding of the nature and advantages of the invention, reference should be had to the ensuing detailed description taken in conjunction with the accompanying drawings.

BRIEF DESCRIPTION OF THE DRAWINGS

FIG. 1 is a perspective schematic view of a single-axis vertical indicating device according to the invention, showing the physical relation of the components;

FIG. 2a is a functional schematic of the invention illustrating the forces acting on the various components of the invention;

FIG. 2b illustrates the angular variables of motion necessary to an understanding of the equations of motion;

FIG. 3 is a functional block diagram of the invention;

FIG. 4 is a schematic of the electronic circuits employed in the invention;

FIG. 5 is a longitudinal sectional view of a preferred single-axis embodiment of the invention;

FIG. 6 is a tranverse sectional view of the preferred single-axis embodiment of the invention, taken through line 6—6 of FIG. 4, showing the construction of the pendulum;

FIG. 7 is a transverse sectional view of the preferred single-axis embodiment of the invention, taken through line 7—7 of FIG. 4, showing the configuration of the pendulum magnets, pickoff coils, and torquer coils;

FIG. 8a is a perspective schematic view of a mounting arrangement for providing a three-axis stabilized platform;

FIG. 8b is a perspective schematic view showing the arrangement of two single-axis devices and an angular accelerometer with respect ot the platform mounted as in FIG. 8a;

FIG. 9 is a perspective schematic of a three-axis device using a spherical two-dimensional pendulum; and FIG. 10 is a partial sectional view illustrating the gimbal-pendulum displacement pickoff.

DESCRIPTION OF THE PREFERRED EMBODIMENT

Turning now to the drawings, FIG. 1 illustrates in schematic form the major components of the invention. As seen in this figure, an angular accelerometer 10, a pendulum 20, and a follow up gimbal 30 are mutually arranged for rotation about a stabilized common horizontal axis 35. A pair of torsion springs 40a and 40b couple the rotational motion of angular accelerometer 10 to that of pendulum 20; a pair of torsion springs 45a and 45b couple pendulum 20 and follow up gimbal 30. A velocity pickoff 50 described more fully below generates a signal proportional to the relative angular velocity between angular accelerometer 10 and pendulum 20. This signal is coupled to a feedback network 55 which generates a signal to drive a torquer 60. Torquer 60, as will be discussed more fully, applies a restoring torque to pendulum 20 in order to electromechanically simulate a large moment of inertia. A pickoff 65 between pendulum 20 and follow up gimbal 30 provides a signal which is fed to a torquer 70 in order to keep follow up gimbal 30 slaved to pendulum 20. The entire assembly is mounted to a frame 75 by means of a pair of gimbal bearings 80, and frame 75 is designed to be secured to the associated vehicle in which the vertical indicating device is used.

In order to better understand the dynamics of the invention as shown in FIG. 1. reference to FIGS. 2a and 2b is desirable. FIG. 2a is a functional block diagram of the mechanical system, showing the various elements and the forces that act on these elements. Thus, angular accelerometer 10 and pendulum 20 are shown coupled by a spring 90, corresponding to torsion springs 40a, 40b of FIG. 1, and a viscous damping element 95. Similarly, pendulum 20 and follow up gimbal 30 are coupled by spring 100 and viscous damping element 105. Spring 100 has as its physical embodiment torsion springs 45a and 45b. Damping elements 95 and 105 are representative of fluid in which the elements are located and geometrical structural considerations, and are described more fully below.

In order to develop the equations of motion of the system, certain angular variables are defined as shown in FIG. 2b. The accelerometer is shown subjected to a tangential acceleration 107. The earth is designated as element 109. In relation to inertial reference 110, angle 115 designated as $\gamma$ is the angle of the pendulum 20 and angle 120 designated as $\lambda$ is the angle of the local vertical. Angle 125 designated as $\beta$ is the angle of the pendulum with respect to the local vertical. Thus $\gamma = \lambda + \beta$.

Angle 127 designated as $\theta$ is the angle between the pendulum and the angular accelerometer reference. In FIG. 2b angles 115, 120, and 125 all increase in the counter-clockwise direction whereas angle 127 increases in the clockwise direction.

In terms of the angular variables thus defined, the following expressions give the equations of motion for the pendulum and for the angular accelerometer for small angle approximations:

$$I\ddot{\gamma} + b_p\dot{\gamma} + (k_p + mgl)\gamma$$
$$= mlR\ddot{\lambda} + b_p\dot{\lambda} + (k_p + mgl)\lambda + b_d\dot{\theta} + k_d\theta + T_p \quad (1)$$
$$J\ddot{\gamma} + J\ddot{\theta} = -b_d\dot{\theta} - k_d\theta \quad (2)$$

where:
I is the pendulum moment of inertia;
$b_p$ is the damping coefficient of damping element 105;
$k_p$ is the spring constant for spring element 100;
m is the imbalanced mass of the pendulum;
l is the effective length of the mass imbalance m.
$b_d$ is the damping coefficient of of damping element 95;
$k_d$ is the spring constant of spring element 90;
$T_p$ is the torque that is fed back and applied by torquer 60; and
J is the angular accelerometer moment of inertia.

In terms of the above constants of the system, it is convenient to establish the following notation:

$$\omega_{np}^2 = \frac{k_p + mgl}{I} \quad \text{undamped pendulum Natural frequency} \quad (3a)$$

$$\zeta_p = \frac{b_p}{2\sqrt{I(k_p + mgl)}} \quad \text{Damping ratio of pendulum} \quad (3b)$$

$$\omega_{nd}^2 = \frac{K_d}{J} \quad \text{Undamped Accelerometer Natural frequency} \quad (3c)$$

$$\zeta_d = \frac{b_d}{2\sqrt{k_dJ}} \quad \text{Damping ratio of accelerometer} \quad (3d)$$

The velocity pickoff 50 has a characteristic response that is flat to inputs of $\dot{\gamma}$ below its natural frequency. Thus, for low frequency angular excitations ($\omega < \omega_{nd}$), the angular accelerometer equation of motion is well represented by:

$k_d\theta = -J\ddot{\gamma}$, or equivalently,
$$\theta = -\frac{1}{\omega_{nd}^2}\ddot{\gamma} \quad (4)$$

Under this condition, substitutions of Equation 4 into Equation 1 yields:

$$\frac{b_d}{k_d}J\ddot{\gamma} + (I + J)\ddot{\gamma} + b_p\dot{\gamma} + (k_p + mgl)$$
$$= mlR\ddot{\lambda} + b_p\dot{\lambda} + (k_p + mgl)\lambda + T_p \quad (5)$$

To satisfy the Schuler turning condition, under which $\gamma = \lambda$, the feedback torque must be given by:

$$T_p = -\frac{b_dJ}{k_d}\ddot{\gamma} - (mlR - K - J)\ddot{\gamma} \quad (6)$$

Thus, it can be seen that the torque to be fed back has two components, with one component proportional to the third derivative of the pendulum angle 115 relative to inertial reference 110, and the other component proportional to the second derivative. As noted above, velocity pickoff 50 generates a signal proportional to $\theta$, with the pickoff voltage $V_o$ being given by:

$$V_{out} = K_{po}\dot{\theta} \quad (7)$$

where $K_{po}$, the proportionality constant, is related to the properties of the pickoff coil and associated magnet. Thus, in view of Equation 4, the fed back toque $T_p$ must contain one component proportional to the output of velocity pickoff 50 and one component proportional to the time integral of that output.

A functional block diagram of a system showing the feedback loops and the transfer functions of the various components is shown in FIG. 3. This block diagram is an alternate representation of the differential equations of motion discussed above. In particular, the combination at torque summing point 130 of transfer function 131 acting on an input of $\ddot{\lambda}$, transfer function 132 acting on an input of $\theta$ and feedback torque 133, which is then acted on by transfer function 134 to produce an output of $\ddot{\gamma}$, is precisely the pendulum's equation of motion (Equation 1). Note that transfer function 132 represents the coupling between the pendulum and the angular accelerometer.

Similarly, transfer function 135 acting on an input $\ddot{\gamma}$ to produce an output $\theta$ is just the angular accelerometer's equation of motion (Equation 2). In a like manner, the summation at point 136 of a term proportional to $\ddot{\gamma}$ (transfer function 137 acting on an input of $V_o$) and a term proportional to $\dot{\gamma}$ (transfer function 139 acting on the output from integrator 138 which itself acts on an input of $V_o$) is the analog of Equation 6.

FIG. 4 is a schematic diagram showing electronic circuitry for generating the voltage for torquer 60 in response to a signal from pickoff 50 proportional to $\dot{\theta}$. Output voltage 140 from pickoff 50 is fed to input differential amplifier 141. Amplifier 143 with resistive feedback transmits and scales the signal proportional to $\dot{\theta}$ ($\dot{\gamma}$) while amplifier 142 with capacitive feedback integrates the signal to produce a signal proportional to $\theta$ ($\dot{\gamma}$). These signals are summed and passed through amplifier 144 and inverting amplifier 145. The signal at the output of amplifier 145 is fed back to the inputs of amplifiers 142 and 143 through voltage follower 146 and low pass amplifier 147 in order to effect DC removal. The resultant voltage is fed to power amplifier 148 and the output at 149 is applied to torquer 60. Note that the output from the integrator 142, being proportional to $\dot{\gamma}$ is also proportional to $\dot{\lambda}$ due to the Schuler tuning. Since the acceleration a is given by:

$$a = R\ddot{\lambda} \quad (8)$$

this signal may be integrated again to give a velocity term which may be fed to a navigation computer.

Typical gains for the velocity feedback ($\dot{\theta}$) and position feedback ($\theta$) of $10^3$ and $10^7$, respectively, have been found to yield a flat frequency response at frequencies between 0.03 Hz and 60 Hz. Optimized gains given exactly by Equation 6 would yield a broader flat range, but this would not be needed for most applications.

Having set forth the operation of the invention, the particular construction of a preferred embodiment can now be described. To avoid confusion, reference numerals for each physical component will be the same as for the corresponding schematic component in FIG. 1 wherever possible.

FIG. 5 is a longitudinal section of a single axis embodiment of the invention. The angular accelerometer 10 and pendulum 20 are hollow cylinders made neutrally buoyant in flotation fluid 150. Fluid 150, which controls the damping coefficients $b_p$ and $b_d$, may be a silicon oil such as Dow 200 silicone available from the Dow Chemical Company, or a high density fluid to minimize flotation volume requirements.

Angular accelerometer 10 is a hollow enclosed cylinder. The construction of pendulum 20 is best understood with additional reference to FIG. 6. Pendulum 20 is of generally annular construction, having longitudinally hollowed opposed sections 155a and 155b with a central gap therebetween. The paired annular portions are supported on quartz fiber assemby 152 by quartz frame 157. Quartz frame 157 has a plurality of ribs 160 extending radially from quartz fiber 145 to a corresponding plurality of longitudinal ribs 165, the ribs fitting into corresponding longitudinal recesses 170 in annular portions 155a and 155b. As can be seen in FIG. 6, annular portion 155b has an internal hollow region 175 so that neutral buoyancy can be obtained. Once the pendulum is balanced, a known pendulosity 177 is added.

It can be seen from FIG. 5 that the physical realization of follow up gimbal 30 is the case 30 in which the flotation fluid is contained. Quartz fiber assembly 145 is cemented to one end of the case 30 and connected to the other end with a spring pre-loading mechanism 180 which serves to accommodate the differential thermal expansion between the case and the quartz fiber and frame assembly. A one kilogram pre-loading is typical.

The pendulum, angular accelerometer, and case may be made of any convenient material, preferably plastic. Alternative materials, e.g., aluminum, beryllium, will occur to those skilled in the art.

Twelve samarium cobalt magnets 200a are mounted in a circle on the end of annular portion 155a in the gap between annular portions 155a, 155b. A corresponding set of magnetic or magnetizable members 200b is mounted on the end of annular portion 155b in the gap between these annular portions. Members 200b may comprise soft iron discs, permanent magnets, particularly samarium cobalt magnets, or the equivalent. Three pickoff coils 50 (FIG. 7) are attached to annular accelerometer 10 to measure the relative rotational rate between angular accelerometer 10 and pendulum 20. Three torquer coils 60 are affixed to case 30. It should be noted that other numbers of magnets 200a and members 200b may be employed, if desired, provided that the magnets are symmetrically arranged in a similar manner to that illustrated.

The configuration of the coils 50 and 60 is best seen with reference to FIG. 7. There are three torquer coils 60 and three pickoff coils 50 for the twelve magnets, the coils being spaced alternately about the axis of the device. Each coil is shaped like an annular segment, being bounded by two radii and two concentric circular arcs. The coils are free standing, each having typically been wound from 600 turns of #38 magnet wire and being epoxy impregnated. They may be wound on a teflon form to allow separation from the form when the epoxy sets. Each coil overlaps a portion of each of two adjoining magnets 200a.

The polarity of magnets 200a alternates by groups of two, i.e., the magnets are arranged NNSSNNSSNNSS around the circle. The two magnets that are overlapped by any coil are of opposite polarity. Thus each coil has no net flux cutting it when there is no torsion on fiber suspension 145. Also, paired adjacent magnets, each of which has a portion in the space between an adjacent torquer and pickoff coil are of the same polarity. Therefore, the flux lines repel, which effectively avoids any magnetic coupling between the torquer and the pickoff coils.

Torquer coils 60 are fastened to case 30 and must clear angular accelerometer 10. Hence, coils 60 are mounted farther from the center than pickoff coils 50, which are fastened to the angular accelerometer and must clear case 30. Each set of three coils (torquer and pickoff) is connected in series. The pickoff coils are connected to case 30 with flex leads. Since the associated electronic circuitry is normally mounted to the vehicle or frame 75, electrical current to torquer coils 60 and current from pickoff coils 50 is fed through slip rings and flex leads (not shown). Case 30 is slaved to pendulum 20 by torquer 70 which responds to a signal from photoelectric pickoff 65 shown in FIG. 10. In this way, the quartz fiber suspension 145 is protected from unbounded twisting which could occur when the frame (i.e., the vehicle) undergoes spiral or rotary motion. Absent this provision, the delicate quartz fiber suspension would either break, or at least be forced to operate in a non-linear manner. The feedback loop used to control torquer 70 need not be as accurately tuned as the loop for controlling torquer 60, since the signal is not used as an input to a navigation computer (as compared to the feedback signal to torquer 60). Torquer 70 is a standard article of manufacture such as an Inland Motors or Magnetic Technology direct current torquer.

The orientation of case 30 relative to frame 75, which is essentially the same as the pendulum angle, is given by a resolver 210. Resolver 210 is a standard article of manufacture such as a Clifton or Kearfott resolver.

With reference to FIG. 10, the case-pendulum displacement pickoff 65 comprises a radiation source 212 and sensor 214, each mounted in a separate recess in case 30, and a flat reflective member 216 carried by the outer surface of portion 155b of pendulum 20. The arrangement is preferably similar to the pick-off disclosed in my co-pending U.S. patent application Ser. No. 845,530, filed Oct. 26, 1977, for "Temperature Stable Displacement Sensor With Fine Resolution", the disclosure of which is hereby incorporated by reference. In operation, angular displacement of pendulum 20 about its axis results in movement of the beam of radiation along the face of Sensor 214, causing a change in the electrical signal output therefrom. This signal is amplified and coupled to the input of torquer 70 to provide a restoring torque to pendulum 20.

The vertical indicating device described above is a single-axis device in the sense that it provides a stable vertical with respect to a given stabilized horizontal axis. Thus, if the device is mounted in a vehicle with the axis (eg., quartz fiber assembly 145) transverse to the vehicle, the output will give a pitch indication but no roll indication. The configuration schematically illustrated in FIGS. 8a and 8b provides a stable vertical platform (thereby providing both pitch and roll information) which may also be stabilized against rotation in the horizontal plane (thereby providing yaw information as well).

FIG. 8a shows a conventional three axis stabilized platform gimbal configuration including platform 220 having a perpendicular shaft 225 which is to be maintained along the direction 227 of the local gravity vector. This alignment is to be maintained in spite of horizontal accelerations along pitch axis 230 or roll axis 240, or equivalently, in spite of attitude changes about roll axis 240 or pitch axis 230, respectively.

Platform 220 is supported with respect to a follow up gimbal 250 (partially depicted) by inner gimbal 255 and outer gimbal 260. Gimbal 250 is typically secured to the frame of the associated vehicle. Platform 220 is rotatable about vertical axis 227 relative to inner gimbal 255, being mounted thereto by inner gimbal bearings 265a and 265b. Inner gimbal 255 is rotatable about pitch axis 230 relative to outer gimbal 260, being mounted thereto by outer gimbal bearings 270a and 270b. Outer gimbal 260 is rotatable about roll axis 240 relative to frame 250, being mounted thereto by frame bearings 275a and 275b. Thus platform 220 is free to assume any angular orientation in space relative to frame 250. This is, of course, necessary if platform 220 is to remain horizontal regardless of the orientation of frame 250.

FIG. 8b shows the configuration of single axis devices necessary to stabilize platform 220. The internal components (angular accelerometer, pendulum, pickoff coils, torquer coils) for two single-axis devices, broadly designated 280 and 285, are mounted to platform 220 in a manner analogous to the way the single-axis device components are mounted to case 30 of the single axis device as described above. In addition, angular accelerometer 290 is mounted along the stabilized vertical axis 227 to stabilize the platform against rotation about vertical axis 227.

In order to keep platform 220 slaved to the pendula of single axis devices 280 and 285, and to angular accelerometer 290, a pickoff, a torquer, and a resolver, arranged to function analogously to pickoff 65, torquer 70, and resolver 210, must be provided for each axis. The pickoffs are mounted to platform 220, and the torquers and resolvers at or near the respective gimbal or frame bearings. For example, a torquer at bearing 270a and a resolver at bearing 270b will stabilize the platform against rotation about pitch axis 230 while providing an output signal specifying frame rotation about pitch axis 230 (i.e., pitch angle). Follow up gimbal 250 is provided to avoid gimbal lock.

While the three-axis device described above uses two single-axis pendula, it is possible to construct a three-axis device using a single pendulum that has two rotational degrees of freedom. A perspective schematic of such a configuration is shown in FIG. 9.

A spherical pendulum 300 is provided with three internally mounted angular accelerometers 301, 302 and 303 with their respective axes arranged along the mutually perpendicular yaw axis 227, roll axis 240, and pitch axis 230. Pendulum 300 has a known pendulosity, denoted schematically as broken line area 305. Pendulum 300 is mounted for rotation about pitch axis 230 in pitch follow-up gimbal 320. Rotation of pendulum 300 about roll axis 240 is thus transmitted to pitch follow-up gimbal 320 which is itself mounted for rotation about roll axis 240 in the roll follow-up gimbal 330. Rotation of pendulum 300 about yaw axis 227 is transmitted by pitch follow-up gimbal 320 to roll follow-up gimbal 330 which is itself mounted for rotation about yaw axis 227 in gimbal 340. Gimbal 340 is mounted for rotation about pitch axis 230 in gimbal 350. Gimbal 350 is mounted for rotation about roll axis 240 in frame 360. Note that gimbals 340 and 350 function to give the subassembly comprising pendulum 300 and follow-up gimbals 320 and 330 freedom to orient itself in any angular orientation relative to frame 360. This is analagous to the manner in which gimbals 255 and 260 allow platform 220 of FIGS. 8a and 8b assume any orientation relative to frame 250.

The embodiments of FIGS. 8a and 8b, and FIG. 9 each represents a geocentric untorqued azimuth configuration. The angular accelerometer oriented along the yaw axis in each is the analog of a directional gyroscope in a conventional navigation system. In particular, it remembers but does not itself find direction along the surface of the earth.

It should be noted that the conventional requirements of a coding sine-cosine resolver on axis 227 to resolve the torquing requirements to the pitch and roll axis torquers apply to the embodiments of FIGS. 8a, 8b and FIG. 9. Similarly, in those embodiments in which large pitch angle motion is expected, a conventional secant resolver should be employed on the pitch axis.

As will now be apparent, angular accelerometer stabilized pendula fabricated according to the teachings of the invention offer several advantages over known devices of the type described above. Firstly, devices constructed according to the invention and used in inertia navigation applications eliminate the need for the gyroscope components formerly required in known devices and the disadvantages inherent therein. In addition, the invention employs an extremely high gain servo feedback system using third derivative feedback which provides a very broad band frequency response (e.g., in the range from 0 to 100 hz), with no disturbing resonances within the band width of interest. Since the natural resonant frequency of the pendulum and the accelerometer lie outside the band width of interest, any potential disturbing influence attributable to these frequencies is completely eliminated. The high gain servo feedback employed in the invention also confines pendulum motion to extremely low aplitudes as a function of the reciprocal of loop gain so that only minute pendulum displacements occur in devices constructed according to the invention. The high gain servo feedback employed with the invention further results in greatly reduced noise levels so that extremely high sensitivity is still obtained even though very minute pendulum displacements are employed.

The invention further eliminates errors commonly encountered in accelerometers and gyroscopes, such as drift, null shift, and bias instability, and eliminates the requirement for thermal compensation of the signal generating elements in most applications.

The flotation suspension of the pendulum and the use of follow-up gimbals completely isolates the pendulum and accelerometer from angular disturbances potentially harmful to the quartz fiber suspension or which introduce measurement errors. It should be noted, however, that the flotation suspension of the pendulum need not be employed in so-called "benign" environments, i.e., applications in which the pendulum is mounted on a very stable base (such as a concrete slab on the earth).

The utilization of an acceleration servo (as contrasted with a velocity servo), which is operative only during periods of acceleration, further reduces any servo loop errors to a great degree. In addition, it should be noted that pickoff 50 responds to the third derivative of pendulum motion and has a flat response to d.c. Since d.c. jerk does not readily occur, any potential disturbing influence due to dc jerk on the system is avoided. It should further be noted that, when used on a vehicle such as an aircraft which normally cruises at relatively constant velocity, typical potential perturbations are high frequency null-seeking conditions. Any errors potentially attributable to these sources can be effectively filtered out by using appropriate electrical filtering techniques.

While the above provides a complete disclosure of the preferred embodiments of the invention, various modifications, alternate constructions and equivalents may be employed without departing from the true spirit and scope of the invention. For example, a crossed flexure pivot such as that available from Bendix Corporation may be employed in certain applications in place of the quartz fiber suspension, if desired. Moreover, any drift of the integrator portion of the feedback circuitry can be eliminated by the inclusion of an auto-nulling low pass filter feedback network, or by the use of digital servo components. Further, a displacement pickoff, such as a capacitive or inductive displacement pickoff, may be used in place of the velocity pickoff 50; while the electromagnetic pickoffs and torquers may be replaced by other types of equivalent pickoffs and torquers in appropriate applications. For example, electrostatic pickoffs may be used to reduce size and cost where power requirements permit. Similarly, mechanical equivalents may be employed. Further, while the system has been disclosed as operating in an open loop servo mode, where space permits a closed loop accelerometer may be used. Lastly, the invention may be used in several alternate configurations to those discussed above, which are representative only. For example, paired angular accelerometers may be employed, each pair being arranged for operation about a given orthogonal axis, with one of the accelerometer pair for each axis having no pendulosity, in order to provide a redundant sensor application capable of sensing acceleration along the relevant axis. Other suitable configurations are a Hook's jointed two-axis pendulum, and a gimballess configuration utilizing the concepts known as the Northrop FLIP and MIT FLIMBAL systems. In addition, it should be noted that the axis of any accelerometer need not be integral and collinear with the associated pendulum axis, but need only be perpendicular to the plane of the pendulum. Therefore, the above description and illustrations should not be construed as limiting the scope of the invention which is defined by the appended claims.

What is claimed is:

1. In a vertical indicating device having a Schuler-tuned pendulum, the pendulum having a rotational degree of freedom about a horizontal axis, the improvement comprising: an angular accelerometer having an axis parallel to the rotational axis of said pendulum; torsional coupling means between said angular accelerometer and said pendulum; means for generating an electrical signal representative of the relative angular velocity between said angular accelerometer and said pendulum; and means responsive to said signal for applying a restoring torque to said pendulum proportional to an acceleration associated to said relative angular velocity; whereby said pendulum has an effective moment of inertia substantially greater than its actual physical moment of inertia, such that its period of oscillation is that of a simple pendulum having a length equal to the earth's radius, whereby said pendulum maintains its alignment with the local gravity vector independently of horizontal acceleration.

2. The combination of claim 1 further including a volume of liquid, and wherein said pendulum and said angular accelerometer comprise coaxial cylinders which are neutrally buoyant in said liquid.

3. The combination of claim 1 wherein said accelerometer axis and said pendulum axis are coincident, and wherein said coupling means between said pendulum and said angular accelerometer comprises a fiber extending along the common axis of said pendulum and said angular accelerometer.

4. The combination of claim 1 wherein said means for generating an electrical signal representative of the relative angular velocity comprises:
   a magnet;
   a coil movable in relation to said magnet wherein an electrical signal substantially proportional to the relative angular velocity between said angular accelerometer and said pendulum is generated;
   integrator means for producing a signal substantially proportional to the time integral of the relative angular velocity between said angular accelerometer and said pendulum; and
   summing means for producing a signal that is a superposition of the signal proportional to the angular velocity between said accelerometer and said pendulum, and the signal porportional to the time integral of the relative angular velocity between said angular accelerometer and said pendulum.

5. The combination of claim 4 wherein said magnet is mounted on said pendulum, and wherein said coil is mounted on said angular accelerometer.

6. The combination of claim 1 wherein said means responsive to the representative signal for applying a restoring torque to the pendulum comprises a magnet and a coil.

7. The combination of claim 6 wherein said magnet is mounted on said pendulum.

8. The combination of claim 1 further including a follow-up gimbal rotatable about the axis of said angular accelerometer and said pendulum; means for generating an electrical signal representative of relative angular motion between said pendulum and said follow-up gimbal; and means responsive to the signal representative of relative angular motion between said pendulum and said follow-up gimbal for applying a torque to said follow-up gimbal in order to maintain said follow-up gimbal aligned with said pendulum.

9. The combination of claim 8 wherein said means for generating an electrical signal representative of the angular velocity between said accelerometer and said pendulum comprises a first plurality of coils coupled to said angular accelerometer, and a first plurality of magnets coupled to said pendulum; and wherein said means responsive to the signal for applying a restoring torque to said pendulum comprises a second plurality of coils coupled to said follow-up gimbal, and a second plurality of magnetizable members coupled to said pendulum; said first and second pluralities of magnets and magnetizable members respectively including a first and a second substantially identical circular array of spaced magnets and magnetizable members, the first circular array being in a plane perpendicular to the rotational axis of said pendulum and the second circular array being in a parallel plane spaced from said first circular array, said first and second circular array being coaxially arranged with respect to the rotational axis of said pendulum; at least said first circular array containing magnets of alternating polarity grouped in pairs; whereby adjacent magnets of said first plurality have the same polarity so that flux coupling between said means for generating an electrical signal and said means for torquing said pendulum is minimized.

10. The combination of claim 9 wherein said magnetizable members comprise magnets of opposite polarity to said magnets of said first plurality.

11. A device for maintaining a stable vertical in two dimensions thereby defining a horizontal plane, comprising:
a frame;
a platform member to be maintained in a fixed relationship to said plane;
a plurality of gimbals mounting said platform to said frame wherein said platform is free to assume any angular orientation in space relative to said frame;
first and second stabilized pendula mounted to said platform, each stabilized pendulum including a pendulum having a rotational degree of freedom about a horizontal axis, an angular accelerometer having an axis parallel to the rotational axis of the associated pendulum, torsional coupling means between said angular accelerometer and said associated pendulum, means for generating an electrical signal representative of the angular velocity between said angular accelerometer and said associated pendulum, and means responsive to said signal for applying a restoring torque to said associated pendulum proportional to an acceleration associated to said relative angular velocity, whereby said associated pendulum is Schuler tuned with respect to its axis of rotation;
the axis of the first stabilized pendulum being parallel to said plane;
the axis of the second stabilized pendulum being parallel to said plane and perpendicular to the axis of said first stabilized pendulum;
first and second means for generating an electrical signal representative of relative angular motion between said platform and said first and second pendula respectively; and
first and second means responsive to said first and second signals representative of relative angular motion between said platform and said first and second pendula, respectively, for applying a torque to said platform in order to slave said platform to said first and second pendula respectively;
whereby said platform is maintained in fixed relationship to the horizontal plane.

12. The combination of claim 11 further including a third angular accelerometer having an axis perpendicular to the respective axes of said first and second stabilized pendula; torsional coupling means between said third angular accelerometer and said platform; means for generating an electrical signal representative of relative angular motion between said third angular accelerometer and said platform about the axis of said third angular accelerometer; and means responsive to said signal representative of the relative angular motion between said platform and said third angular accelerometer for applying a torque to said platform in order to maintain said platform in a fixed orientation in the horizontal plane.

13. A device for maintaining a stable vertical in two dimensions thereby defining a horizontal plane comprising:
a frame;
a pendulum assembly having a first rotational degree of freedom about a first horizontal pitch axis and having a second rotational degree of freedom around a second horizontal roll axis;
a plurality of gimbals mounting said pendulum assembly to said frame whereby said pendulum assembly is free to assume any angular orientation relative to said frame;
first and second angular motion sensors, each including an angular accelerometer having a rotational degree of freedom about an axis, torsional coupling means between said angular accelerometer and the associated pendulum along the angular accelerometer axis, means for generating an electrical signal representative of the relative angular velocity between said angular accelerometer and said associated pendulum, and means responsive to said signal representative of the relative angular velocity for applying a restoring torque to said associated pendulum proportional to an acceleration associated to said relative angular velocity, whereby said associated pendulum is Schuler tuned with respect to the corresponding angular accelerometer axis;
the first angular accelerometer having its axis aligned with said pitch axis;
the second angular accelerometer having its axis aligned with said roll axis;
whereby said pendulum assembly is Schuler tuned with respect to both the pitch and the roll axis.

14. The combination of claim 13 further including a third angular accelerometer having an axis perpendicular to the respective axes of said first and second angular accelerometers; torsional coupling means between said third angular accelerometer and said pendulum assembly; means for generating an electrical signal representative of relative angular motion between said third angular accelerometer and said pendulum assembly about the axis of said third angular accelerometer; and means responsive to said signal representative of relative angular motion between said third angular accelerometer and said pendulum assembly for applying a torque to said pendulum assembly in order to maintain said pendulum assembly in a fixed orientation in the horizontal plane.

15. The combination of claim 13 wherein said pendulum assembly comprises a roll follow-up gimbal mounted to said plurality of gimbals for rotation about the vertical axis; a pitch follow-up gimbal mounted to said roll follow-up gimbal for rotation about the roll axis; and a spherical pendulum mounted to said roll follow-up gimbal for rotation about the pitch axis.

* * * * *